United States Patent
Böhme et al.

(10) Patent No.: US 12,360,997 B2
(45) Date of Patent: Jul. 15, 2025

(54) SCHEDULING QUERY EXECUTION PLANS ON A RELATIONAL DATABASE

(71) Applicant: International Business Machines Corporation, Armonk, NY (US)

(72) Inventors: Thomas Friedhelm Böhme, Boeblingen (DE); Oliver Schiller, Boeblingen (DE); James Liam Finnie, Boeblingen (DE); Ingo Schuster, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 17/114,786

(22) Filed: Dec. 8, 2020

(65) Prior Publication Data

US 2022/0179861 A1 Jun. 9, 2022

(51) Int. Cl.
*G06F 16/2453* (2019.01)

(52) U.S. Cl.
CPC .. *G06F 16/24542* (2019.01); *G06F 16/24532* (2019.01); *G06F 16/24539* (2019.01)

(58) Field of Classification Search
CPC ......... G06F 16/24542; G06F 16/24532; G06F 16/24539
See application file for complete search history.

(56) References Cited

U.S. PATENT DOCUMENTS

| | | | |
|---|---|---|---|
| 6,014,655 A * | 1/2000 | Fujiwara | G06F 16/24557 |
| 8,280,869 B1 | 10/2012 | Burger | |
| 10,031,942 B2 | 7/2018 | Dickie | |
| 10,042,887 B2 | 8/2018 | Dickie | |
| 2001/0037322 A1 | 11/2001 | Lindsay | |
| 2005/0131893 A1* | 6/2005 | Von Glan | G06F 16/24532 707/999.005 |
| 2007/0226176 A1 | 9/2007 | Bestgen | |

(Continued)

FOREIGN PATENT DOCUMENTS

| | | |
|---|---|---|
| CN | 102262636 A | 11/2011 |
| CN | 104216893 A | 12/2014 |

OTHER PUBLICATIONS

Optimizing Table Scans with Zone Maps, https://blogs.oracle.com/datawarehousing/optimizing-table-scans-with-zone-maps, Nov. 11, 2014.

(Continued)

*Primary Examiner* — Ann J Lo
*Assistant Examiner* — Fernando M Mari Valcarcel
(74) *Attorney, Agent, or Firm* — Eric W. Chesley

(57) ABSTRACT

A method, a computer program product, and a system for scheduling a first query execution plan for executing a first query for accessing first data sets of data of a relational database system (RDBS) and a second query execution plan for executing a second query for accessing second data sets of the data. The data is divided into data blocks of data sets of the data, wherein metadata of the RDBS comprises respective information about at least one property of the data sets of a respective data block of the data blocks. The scheduling may be performed on the basis of an examination if there is a common partition between a first partition of data blocks which may fulfill a first condition according to the first query and a second partition of data blocks which may fulfill a second condition according to the second query.

18 Claims, 10 Drawing Sheets

(56) References Cited

U.S. PATENT DOCUMENTS

| | | | |
|---|---|---|---|
| 2008/0091757 A1* | 4/2008 | Ingrassia | G06T 11/206 708/490 |
| 2008/0104008 A1* | 5/2008 | Brantley | G06F 16/20 |
| 2009/0144346 A1* | 6/2009 | Duffy | G06F 16/24532 |
| 2009/0235356 A1* | 9/2009 | Jensen | G06N 5/043 726/23 |
| 2009/0271385 A1* | 10/2009 | Krishnamoorthy | G06F 16/24532 |
| 2013/0124525 A1* | 5/2013 | Anderson | G06F 16/278 707/737 |
| 2013/0152090 A1* | 6/2013 | Balko | G06F 9/52 718/102 |
| 2014/0089282 A1* | 3/2014 | Sampathkumar | G06F 16/24 707/705 |
| 2014/0095520 A1 | 4/2014 | Ziauddin | |
| 2015/0067819 A1* | 3/2015 | Shribman | H04L 67/141 709/218 |
| 2016/0371329 A1* | 12/2016 | Bensberg | G06F 16/24542 |
| 2017/0270161 A1 | 9/2017 | Brodt | |
| 2018/0268027 A1* | 9/2018 | Gold | G06F 12/0815 |
| 2019/0392067 A1* | 12/2019 | Sonawane | G06F 16/2379 |
| 2020/0364223 A1* | 11/2020 | Pal | G06F 16/24539 |

OTHER PUBLICATIONS

Partitioned Resource Allocation and Query Scheduling Policy for a Database Server, Oct. 7, 2005, IP.com No. IPCOM000129726D, https://priorart.ip.com/IPCOM/000129726.

What is Isolation?—Definition from Techopedia.

Wikipedia: ACID, Jul. 11, 2020.

Lang, Christian & Bhattacharjee, Bishwaranjan & Malkemus, Timothy & Wong, Kwai. (2007). Increasing Buffer-Locality for Multiple Index Based Scans through Intelligent Placement and Index Scan Speed Control . . . 1298-1309. https://www.researchgate.net/publication/221310743_Increasing_Buffer-Locality_for_Multiple_Index_Based_Scans_through_Intelligent_Placement_and_Index_Scan_Speed_Control.

PCT/IB2021/061407—International Search Report and Written Opinion, mailed Mar. 9, 2022.

\* cited by examiner

| 03.01. | 29.09. |
|--------|--------|
| 02.01. | 12.09. |
| 09.01. | 23.09. |
| 09.07. | 28.12. |
| 12.07. | 11.11. |
| 20.07. | 19.12. |

SCHEDULING QUERY EXECUTION PLANS ON A RELATIONAL DATABASE

BACKGROUND

The present disclosure relates to the field of database technology, and more specifically, to a method for scheduling queries for accessing data sets of data of a relational database system.

Relational database systems comprise data tables that are linked to each other. Queries are used to retrieve and to update the data sets based on criteria formulated in the form of expressions and predicates. The queries may be optimized with respect to the predicates by a query optimizer of the relational database system. For example, computational costs for performing different variants to execute the queries on the database system may be estimated depending on the predicates, and the queries may be optimized with respect to a reduction of the computational costs. The optimized queries may then be translated into a query execution plans. The query execution plans may be scheduled by using a workload manager of the relational database system.

SUMMARY

Various embodiments provide a computer system and a method as described by the subject matter of the independent claims. Advantageous embodiments are described in the dependent claims. Embodiments of the present disclosure can be freely combined with each other if they are not mutually exclusive.

In one aspect, the disclosure relates to a method for scheduling a set of query execution plans, the set of query execution plans comprising at least a first query execution plan for executing a first query for accessing first data sets of data of a relational database system, RDBS, and a second query execution plan for executing a second query for accessing second data sets of the data, the data is divided into data blocks of data sets of the data, wherein metadata of the RDBS comprises a respective information about at least one property of the data sets of a respective data block of the data blocks. The method comprises determining a first partition of the data blocks being potentially accessed in case the first query execution plan is executed on the RDBS on the basis of the metadata and a condition the first data sets have to fulfill according to the first query;

determining a second partition of the data blocks being potentially accessed in case the second query execution plan is executed on the RDBS on the basis of the metadata and a condition the second data sets have to fulfill according to the second query;

performing an examination if there is a common partition of data blocks of the first partition and the second partition;

scheduling the first query execution plan and the second query execution plan on the RDBS on the basis of a result of the examination.

In another aspect, the disclosure relates to a computer program product comprising a computer-readable storage medium having computer-readable program code embodied therewith, the computer-readable program code configured to implement the method according to preceding embodiments.

In another aspect, the disclosure relates to a computer system for scheduling a set of query execution plans, the set of query execution plans comprising at least a first query execution plan for executing a first query for accessing first data sets of data of a relational database system, RDBS, and a second query execution plan for executing a second query for accessing second data sets of the data, the data is divided into data blocks of data sets of the data, wherein metadata of the RDBS comprises respective information about at least one property of the data sets of a respective data block of the data blocks. The computer system may be configured for determining a first partition of the data blocks being potentially accessed in case the first query execution plan is executed on the RDBS on the basis of the metadata and a condition the first data sets have to fulfill according to the first query;

determining a second partition of the data blocks being potentially accessed in case the second query execution plan is executed on the RDBS on the basis of the metadata and a condition the second data sets have to fulfill according to the second query;

performing an examination if there is a common partition of data blocks of the first partition and the second partition;

scheduling the first query execution plan and the second query execution plan on the RDBS on the basis of a result of the examination.

BRIEF DESCRIPTION OF THE DRAWINGS

The following embodiments of the disclosure are explained in greater detail, by way of example only, making reference to the drawings in which:

FIG. 10 depicts a table indicating further metadata of data blocks of the data table of FIG. 7;

DETAILED DESCRIPTION

Figure 1:
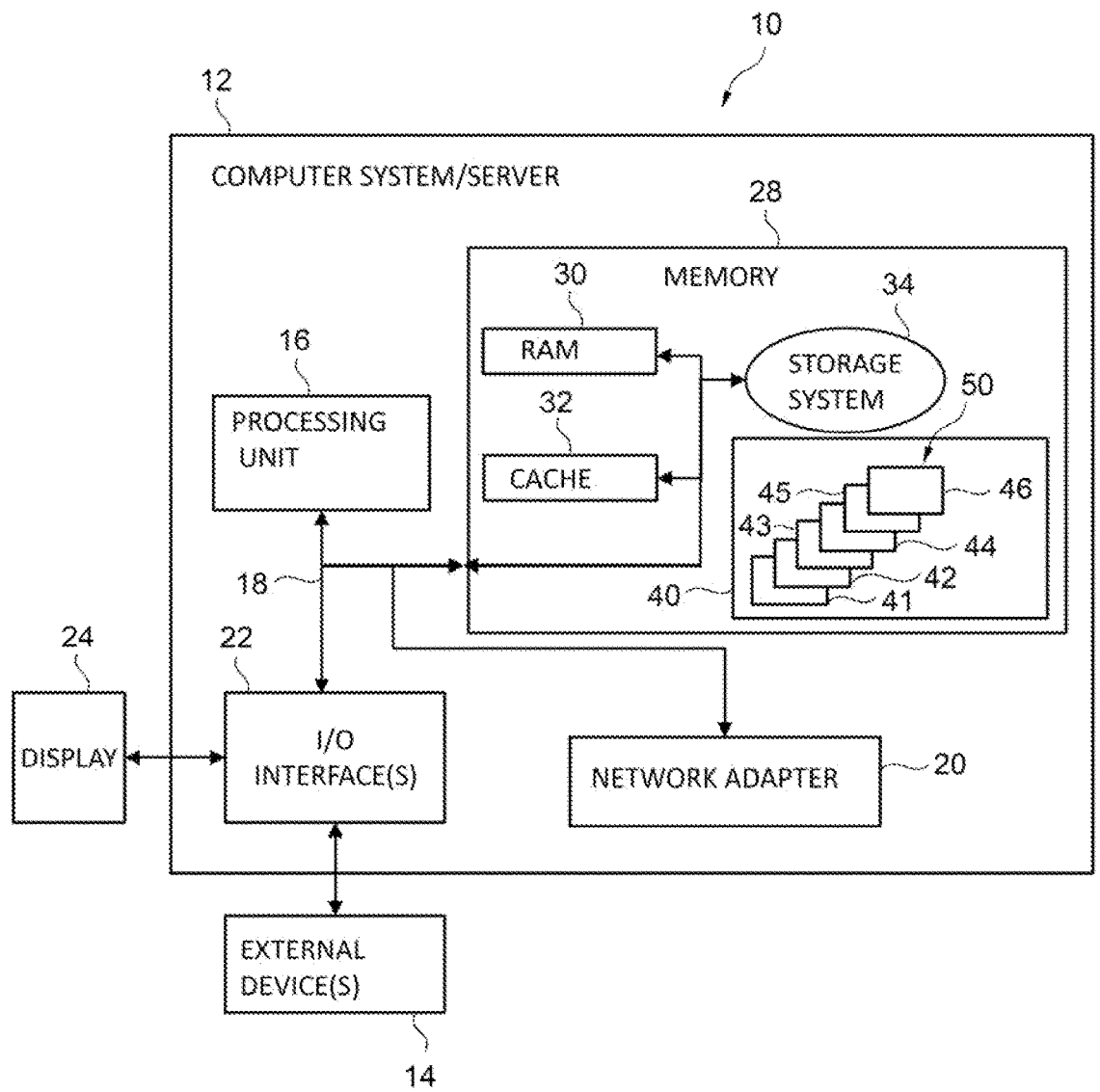
FIG. 1 illustrates a computer system in accordance with the present subject matter.

The present disclosure relates to the field of database technology, and more specifically, to a method for scheduling queries for accessing data sets of data of a relational database system. The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term relational database system (RDBS), as used herein, is also known as a relational database management system (RDBMS). Additionally, the terms first query execution plan and the second query execution plan may also be referred to as the first plan and second plan, respectively, in the following. Furthermore, the common partition of data blocks of the first partition and the second partition may also be referred to as common partition in the following. The examination of whether the common partition exists may also be referred to as examination.

The condition the first data sets have to fulfill according to the first query is also referred to as the first condition in the following. Analogously, the condition the second data sets have to fulfill according to the second query is also referred to as the second condition in the following. The first plan includes commands for accessing, i.e., reading, the first data sets and/or for changing the first data sets. Similarly, the second plan includes commands for accessing, i.e., reading, the second data sets and/or for changing the second data sets. The first and the second plan may be generated on the basis of the first query and the second query respectively, using a query compiler of the RDBS. The first and the second query includes a first statement comprising the first condition and a second statement comprising the second condition, respectively.

Scheduling the first plan and the second plan on the basis of the result of the examination has the following advantages. In the first place, if there is no common partition, a single data set of the data can only be accessed by either executing the first plan or by executing the second plan on the RDBS. In other words, one data set cannot be accessed the first time by running the first plan and then be accessed a second time by running the second plan or vice versa. Hence, stating that there is no common partition may be equivalent to stating that there does not exist any data set which may be accessed when executing the first plan and may be accessed as well when executing the second plan. This means that the execution of the first plan and the second plan are isolated from each other with respect to the data sets of the data if there is no common partition.

For example, the first plan cannot cause an update of one of the data sets of the data, which may be read by executing the second plan or vice versa. For that reason, performing the examination if the common partition exists may guarantee isolation of the first plan with respect to the second plan considering the data sets of the data if there is no common partition. This may reduce computational costs of the RDBS when performing the first and the second plan in parallel.

For example, a locking mechanism of the RDBS for locking at least a part of the first partition of the data blocks and/or the second partition of the data blocks such that these data blocks may only be accessed by execution of a single query execution plan at an instant of time may provoke a different execution of the first plan and the second plan on the RDBS if there is no common partition. The locking mechanism may, for example, not lock the first partition and/or the second partition of data blocks when the first and the second plan are executed in parallel if there is no common partition.

However, the locking mechanism may lock the first partition and/or the second partition of data blocks when the first and the second plan are executed in parallel if the common partition exists. Hence, a required computational load for locking the first partition and/or the second partition of data blocks may be reduced if there is no common partition. This can be advantageous if the first plan and the second plan access the same data table of the RDBS.

Typically, the locking mechanism is activated if the first plan and the second plan access the same data table. However, embodiments of the present disclosure can overcome this disadvantage such that it is possible to deactivate the locking mechanism if there is no common partition when the first plan and the second plan access the same data table. When no common partitions are accessed, access isolation is guaranteed.

In some embodiments, determining the data blocks accessed by the first and the second partition are performed on the basis of the metadata. Additionally, the scheduling may be performed on the basis of the result of the examination. Information from the examination about the data can also be used for the scheduling. This information can be used to reduce restrictions on the execution of the first and/or the second plan. A reduction of the restrictions may result in the deactivation of the locking of the first and/or second partition. The reduction of the restrictions can reduce computational resources and time in general.

Furthermore, when no common partition exists between the plans, it is not necessary to schedule the first plan and the second plan such that these plans do not overlap with respect to their time of execution. Usually, this may be done in order to prevent the locking mechanism from being activated, for example, if the first plan and the second plan access the same data table. Therefore, a restriction with respect to the scheduling may be reduced or discarded if there is no common partition. In this case, an optimization of the scheduling of the set of query execution plans can be simplified as a number of restrictions, which may be considered as boundary conditions for optimizing the scheduling of the plans.

Also, if a common partition exists, a result of the first plan may be used for the second plan or vice versa. As a consequence, the number of data sets accessed when executing the first and the second plan can be reduced. Thereby potentially reducing the computational costs.

In some embodiments, it is determined whether the first partition includes discarding a first complementary partition of data blocks on the basis of the metadata with a first condition being such that a first data sets have to be fulfilled according to the first query. The first complementary partition of the data blocks may represent data blocks of data not being accessed when the first query execution plan is executed on the RDBS. Furthermore, in some embodiments, it is determined whether the second partition includes discarding a second complementary partition of the data blocks using the metadata and the second condition the second data sets have to fulfill according to the second query. The second complementary partition of data blocks may represent data blocks of data not being accessed in case the second query execution plan is executed on the RDBS. The first complementary partition is considered as a complement to the first partition and vice versa. This means that the first partition and the first complementary partition are disjoint and can build the data together. Analogously, the second complementary partition is considered as a complement to the second partition and vice versa. This means that the second partition and the second complementary partition are disjoint and also build the data together.

Determining whether the first partition discards the first complementary partition is advantageous as not all data blocks not accessed when executing the first plan have to be found in order to create the first complementary partition. On the contrary, if the first complementary partition is not determined by discarding the first complementary partition, all possible data blocks being potentially accessed in case the first plan is executed have to be found in order to safely state that there is no common partition in case the result of the examination suggests so. To achieve that, the metadata of all the respective data blocks of the data has to be checked against the first condition. To complete this kind of routine may take longer, especially if the data blocks are very small and numerous.

However, the generation of the first complementary partition can be aborted at any time and does not have to be completed. In this case, if the first partition is determined as the complement of the first complementary partition, the result of the examination can be considered as certain if the result is such that there is no common partition. Consequently, this embodiment may speed up generating the first partition. Similarly, the determining of the second partition by discarding the second complementary partition may lead to the same advantages for the same reasoning applied to the second partition, the second condition, and the second complementary partition. The metadata may be considered as a much more compact information about the data compared, for example, to an index indexing each data set of the data. Such compact information may not be very suitable for an examination if one of the data sets of the data may fulfill the first or second condition. However, this compact information in the form of the metadata may be very useful for discarding the data blocks of data sets, which may not be accessed for testing the first or second condition on these data sets. This effect may be used for scheduling.

In some embodiments, the method also includes scheduling a first query execution plan and a second query execution plan such that a result of the first query execution plan is available in a cache memory of the RDBS for usage of the second query execution plan if there is a common partition of data blocks of the first partition and the second partition. For example, the first plan and the second plan may be scheduled such that at least a part of the result of the first plan is stored in the cache memory when the second plan is executed on the RDBS or vice versa if the common partition exists. This embodiment may secure that at least a part of the result of the first plan may be used for the execution of the second plan or vice versa if the common partition exists. The scheduling may be performed as a function of an actual space being available on the cache memory and an estimated required size of the cache to store the results or the part of the results of the first plan or the second plan.

In some embodiments, the method also includes activating the locking mechanism of the RDBS for locking the data blocks of the common partition such that these data blocks may only be accessed by execution of a single query execution plan at an instant of time. The locking mechanism may be activated if the common partition exists. The single execution plan may be either the first plan or the second plan. This variant secures the isolation of the data and is preserved when running the first and the second plan. The term "isolation of the data" as used herein implies that concurrent executions of the query execution plans of the set leave the data in the same state that would have been obtained if these plans were executed sequentially.

In some embodiments, the method also includes scheduling the first query execution plan and the second query execution plan such that the first query execution plan and the second query execution plan are executed in parallel on the RDBS if there is no common partition of data blocks of the first partition and the second partition. Parallel execution of the first and the second plan may speed up the execution of the set of query execution plans. In case the common partition does not exist, the first and the second plan may be executed in parallel, and the required computational load for locking the first partition and/or the second partition of data blocks may be very low or even be zero. Therefore, a gained speed up of the execution of the set of query execution plans may not be deteriorated by the locking mechanism. If the common partition does not exist, i.e., the size of the common partition is zero, the first and second plans run in parallel without risking a loss of isolation of the data. In most cases, the locking mechanism is not activated for the first and/or second partition if there is no common partition.

In some embodiments, the method includes deactivating the locking mechanism of the RDBS for locking at least a part of the first partition of the data blocks and the second partition of the data blocks. The locking mechanism ensures that these data blocks are only accessed by the execution of a single query execution plan at an instant of time. According to embodiments, the locking mechanism may be deactivated if there is no common partition. The deactivating of the locking mechanism may be performed if the first plan and the second plan are executed in parallel. Depending on the locking mechanism, the locking mechanism may allocate computational resources when executing the first and the second plan even if there is no common partition. For example, the locking mechanism includes a function for checking if the common partition exists. In this case, deactivating the locking mechanism may reduce the computational costs if there is no common partition.

In some embodiments, information regarding the property of the data sets of the respective data block is a range in which data values of the data sets of the respective data block lie. The range may be defined by a minimal data value in the respective data block and a maximal data value in the respective data block. Using the range as the respective information about the property of the data sets of the respective data block, i.e., using the range as the metadata, has the advantage that with only two values, the minimal and the maximal data value, important information of these data sets are provided which may reduce a running time of the first or second plan may reduce. For example, based on the range, one or more respective data blocks are discarded if the data sets of these blocks do not match the first or second condition. The range in which the data values of the data sets of the respective data block lie may represent one of the most compact information of these data sets and can also assist in reducing the running time of the first and second plan.

In some embodiments, the data of the RDBS is stored using a data table. The range is defined by a minimal data value in a column of the data table in its respective data block and a maximal data value in the column of the data table in its respective data block. The respective data block may indicate a respective block of rows of the data table. If the range refers to data values of the column of the table, determining the first and second partition, especially discarding of the first and the second complementary partition, may be performed on a finer level. This may result in an amplification of the first and/or the second complementary partition and result in a reduction of the size of the first and/or second partition. Thus, the computational costs for performing the first and/or second plan may be reduced.

In some embodiments, the property of the data sets may be a distribution of data values within the respective data block. The respective information about the property of the data sets of the respective data block may describe the distribution of the data values. The distribution of the data values within the respective data block may contain more information about the data sets of the respective block and may enable a determination of the first and the second partition, especially during execution of the discarding of the first and the second complementary partition. For the same reasoning mentioned above, this may reduce the computational costs for performing the first and/or second plan. The information describing the distribution includes a number of intervals dividing the range mentioned above into parts of equal length. The information describing the distribution may further comprise a respective number of data sets corresponding to each interval, the respective number of data sets indicating the number of data sets of the respective data block comprising data values which lie in the respective interval. Alternatively, or in addition, the information describing the distribution includes a type of distribution of the data values of the data sets.

In some embodiments, the data of the RDBS is stored using a data table with a distribution referring to a distribution of the data values in a column of the data table in the respective data block. The respective information about the property of the data sets of the respective data block describes the distribution of the data values in the column of the data table within the respective data block. The respective data block may indicate a respective block of rows of the data table. This may increase the level of refinement when performing the first and/or second plan. Similarly, an increase in the refinement may reduce the computational costs for performing the first and/or second plan.

In some embodiments, the distribution is represented by a density vector. The vector may represent a compact form of the respective number of data sets corresponding to each interval.

In some embodiments, one of the two query execution plans, the first or the second query execution plan, may run at an actual instant of time, and the other one of the two query execution plans may be scheduled to be started at a future instant of time. This describes the usage of the presented method in case one of the query execution plans, the first or the second plan, is currently running on the RDBS, and the other one is currently not running but is scheduled to run in the future. Hence, the embodiments of the disclosure are not restricted to an application in which the first and the second plan run in the future, considering the actual instant of time as a moment in which the scheduling is performed.

In some embodiments, the first query execution plan and the second query execution plan are scheduled to run immediately after each other. This may increase the probability that the result of the first plan is available in the cache memory of the RDBS for the usage of the second plan or vice versa. This embodiment is advantageous if there is a common partition.

In some embodiments, the method includes receiving the metadata from a query optimizer of the RDBS. The query optimizer may use the metadata for its own purpose, namely for optimizing the first and/or second plan. For that reason, the query optimizer may have already loaded the metadata referring to the respective data block of the data blocks from a metadata database into a cache memory of the query optimizer. A workload manager of the RDBS can perform the scheduling by reading the metadata from the cache memory of the query optimizer. This may be faster than reading the metadata from the metadata database again.

In some embodiments, the method includes receiving information for specifying the first partition and the second partition from the query optimizer of the RDBS. The query optimizer may intersect the first and the second statement of the first and second query, respectively, with the metadata. In doing so, the query optimizer may retrieve the information for specifying the first partition and the second partition. In other words, this describes an efficient usage of the information already computed by the query optimizer.

In some embodiments, the method includes setting boundary conditions for running the query optimizer of the RDBS such that the common partition is void. If the query optimizer generates the first and second plans such that a common partition does not exist, the above-mentioned advantages may be yielded. It may occur that the first and/or the second plan is less efficient considered as a single query execution plan as such. However, the reduction of the computational load if the common partition is void may overcome such a decrease in efficiency.

Embodiments of the present disclosure may be implemented using a computing device that may also be referred to as a computer system, a client, or a server. Referring now to FIG. 1, a schematic of an example of a computer system 10 is shown. The computer system 10 may be only one example of a suitable computer system and may be not intended to suggest any limitation as to the scope of use or functionality of embodiments of the disclosure described herein. Regardless, computer system 10 is capable of being implemented and/or performing any of the functionality set forth hereinabove.

The computer system 10 includes a computer system/server 12, which may be operational with numerous other general purpose or special purpose computing system environments or configurations. Examples of well-known computing systems, environments, and/or configurations that may be suitable for use with computer system/server 12 include, but are not limited to, a stack 303 of a relational database system 300, RDBS 300, shown in FIG. 3, a query compiler 302 of the RDBS 300, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed computing environments that include any of the above systems or devices, and the like.

Figure 3:
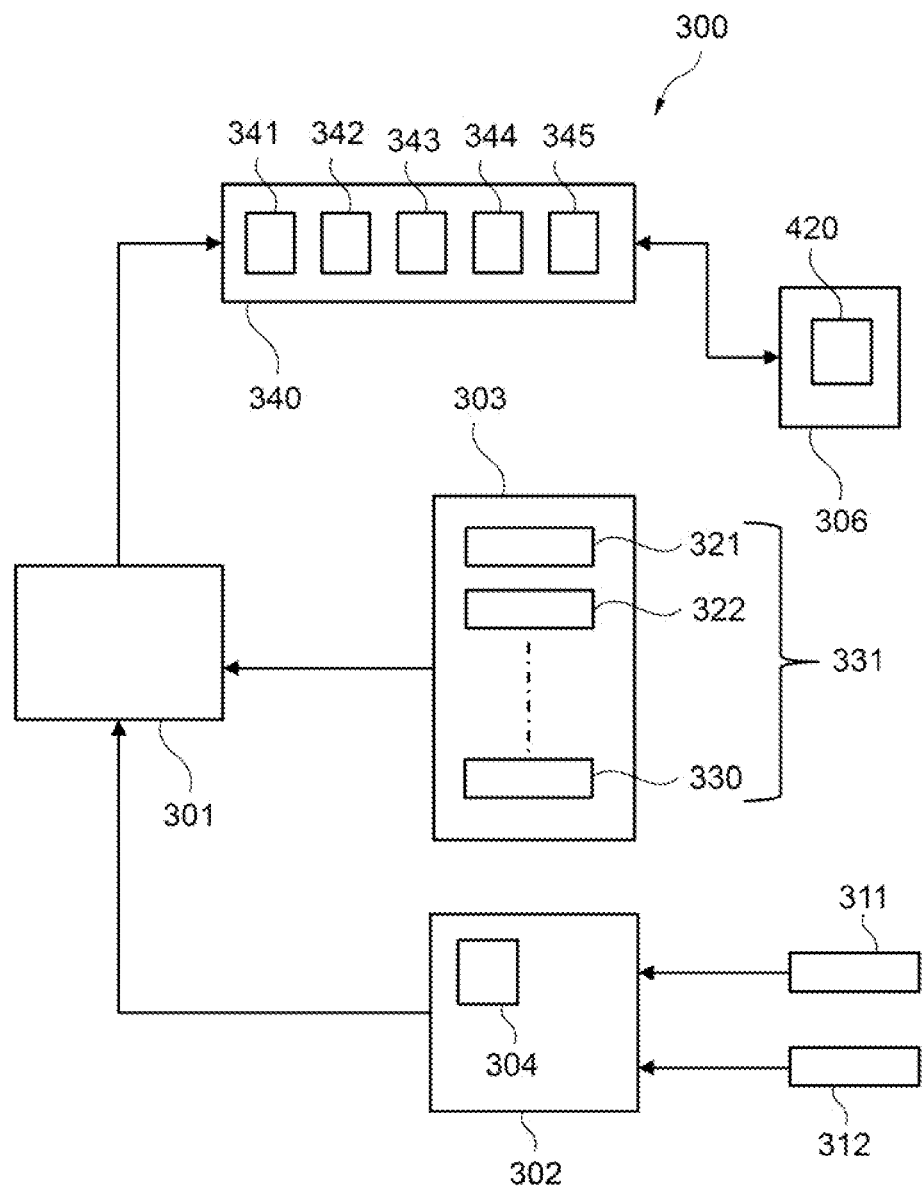
FIG. 3 depicts a relational database system.

In one example, the computer system/server 12 may be designed in the form of a workload manager 301 of the RDBS 300, shown in FIG. 3. The RDBS 300 includes the query compiler 302 for compiling queries, such as a first query 311 and a second query 312, into query execution plans, such as a first query execution plan 321, in the following also referred to as first plan 321, and a second query execution plan 322, in the following also referred to as second plan 322.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media, including memory storage devices. One example of the remote processing devices may be the query compiler 302, which may perform tasks for the workload manager 301.

As shown in FIG. 1, computer system/server 12 in the computer system 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus and Peripheral Component Interconnect Express (PCIe) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30, a solid-state drive (SSD), and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 50, may be stored in memory 28 by way of example, and not limitation, as well as an operating system, one or more application programs, other program modules, and program data. Each of the operating system, one or more application programs, other program modules, and program data or some combination thereof may include an implementation of a networking environment. Program modules 50 generally may be configured to carry out the functions and/or methodologies of embodiments of the disclosure as described herein.

The term "program" or "program module" as used herein refers to a set of instructions that contains commands to provoke actions performed by the processor 16 when the processor 16 may read the commands. The set of instructions may be in the form of a computer-readable program, routine, subroutine, or part of a library, which may be executed by the processor 16 and/or may be called by a further program being executed by the processor 16. Preferably the program modules 50 may be executable programs that are compiled according to a type of hardware platform of the computer system/server 12.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 may communicate with the other components of computer system/server 12 via bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

A computer system such as the computer system 10 shown in FIG. 1 may be used for performing operations disclosed herein, such as a first, second, third, fourth, fifth, and sixth operation. For example, the processor 16 may perform the first, second, third, fourth, fifth, and sixth operation.

The computer system 10 may be configured for scheduling a set of query execution plans 331 of FIG. 3. The set of query execution plans 331 include at least the first query execution plan 321 for executing the first query 311 for accessing first data sets 411 of data 400 of the RDBS 300 in FIG. 4. Furthermore, the set 331 includes the second query execution plan 322 for executing the second query 312 for accessing second data sets 412 of the data 400. The data 400 may be divided into data blocks 410 of data sets of the data 400. Metadata 304 of the RDBS 300 includes a respective information about at least one property of the data sets of respective data blocks 410. The data blocks 410 may, for example, comprise a first data block 410-1, a second data block 410-2, a third data block 410-3, a fourth data block 410-4, a fifth data block 410-5, and a sixth data block 410-6. The data sets of the data blocks 410 are indicated in the form of boxes in FIG. 4.

The first operation includes determining a first partition 401 of the data blocks 410 being potentially accessed in case the first query execution plan 321 is executed on the RDBS 300 on the basis of the metadata 304 and a condition the first data sets 411 have to fulfill according to the first query 311, in the following referred to as first condition.

The second operation includes determining a second partition 402 of the data blocks 410 being potentially accessed in case the second query execution plan 322 is executed on the RDBS 300 on the basis of the metadata 304 and a condition the second data sets 412 have to fulfill according to the second query 312, in the following referred to as the second condition.

The third operation includes performing an examination if there is a common partition of data blocks of the first partition 401 and the second partition 402.

This fourth operation includes scheduling the first query execution plan 321 and the second query execution plan 322 on the RDBS 300 on the basis of a result of the examination.

The fifth operation includes determining the first partition 401 by discarding a first complementary partition 701 of the data blocks 410 on the basis of the metadata 304 and the first condition.

The sixth operation includes determining the second partition 402 by discarding a second complementary partition 702 of the data blocks 410 on the basis of the metadata 304 and the second condition.

The processor 16 may perform the first, second, third, fourth, fifth, and sixth operation by executing a first program module 41, a second program module 42, a third program module 43, a fourth program module 44, a fifth program module 45 and sixth program module 46 respectively. The first processor 102 may execute a main program 51. The main program 51 may initiate execution of the program modules 41, 42, 43, 44, 45, 46 on the processor 16.

The computer system 10 may be a standalone computer with no network connectivity that may receive data to be processed, such as the first plan 321 and the second plan 322, through a local interface. Such operation may, however, likewise be performed using a computer system that is connected to a network such as a communications network and/or a computing network.

Figure 2:
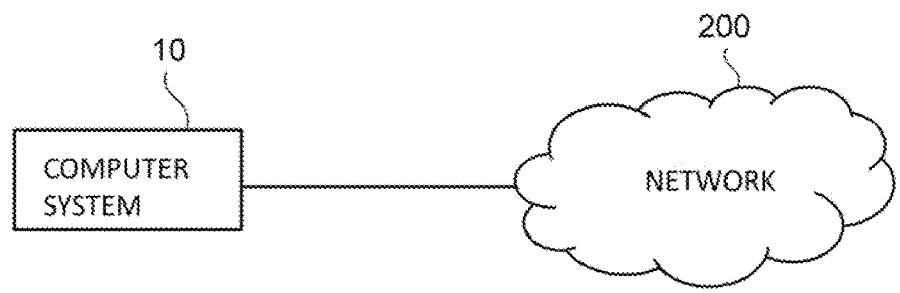
FIG. 2 depicts a network connected to the computer system of FIG. 1.

FIG. 2 shows an exemplary computing environment where a computer system such as computer system 10 is connected, e.g., using the network adapter 20, to a network 200. The RDBS 300 includes the network 200 and may also be considered as a computer system such as the computer system 10. The RDBS 300, and preferably components of the RDBS 300 such as the query compiler 302, includes components being similar to the components of the computer system 10 such as one or more processors or processing units like the processor 16, a system memory such as the system memory 28, and a bus such as the bus 18 that couples various system components. Without limitation, the network 200 may be a communications network such as the Internet, a local-area network (LAN), a wireless network such as a mobile communications network, and the like. The network 200 includes a computing network such as a cloud-computing network. The computer system 10 may receive data to be processed, such as the first plan 321 and the second plan 322, from the network 200 and/or may provide a computing result, such as a schedule 600 comprising an order of execution of at least the first plan 321 and the second plan 322, to another computing device connected to the computer system 10 via the network 200.

The computer system 10 may perform operations described herein, such as the first, second, third, fourth, fifth and sixth operation entirely or in part, in response to a request received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory, using the network 200.

Figure 4:
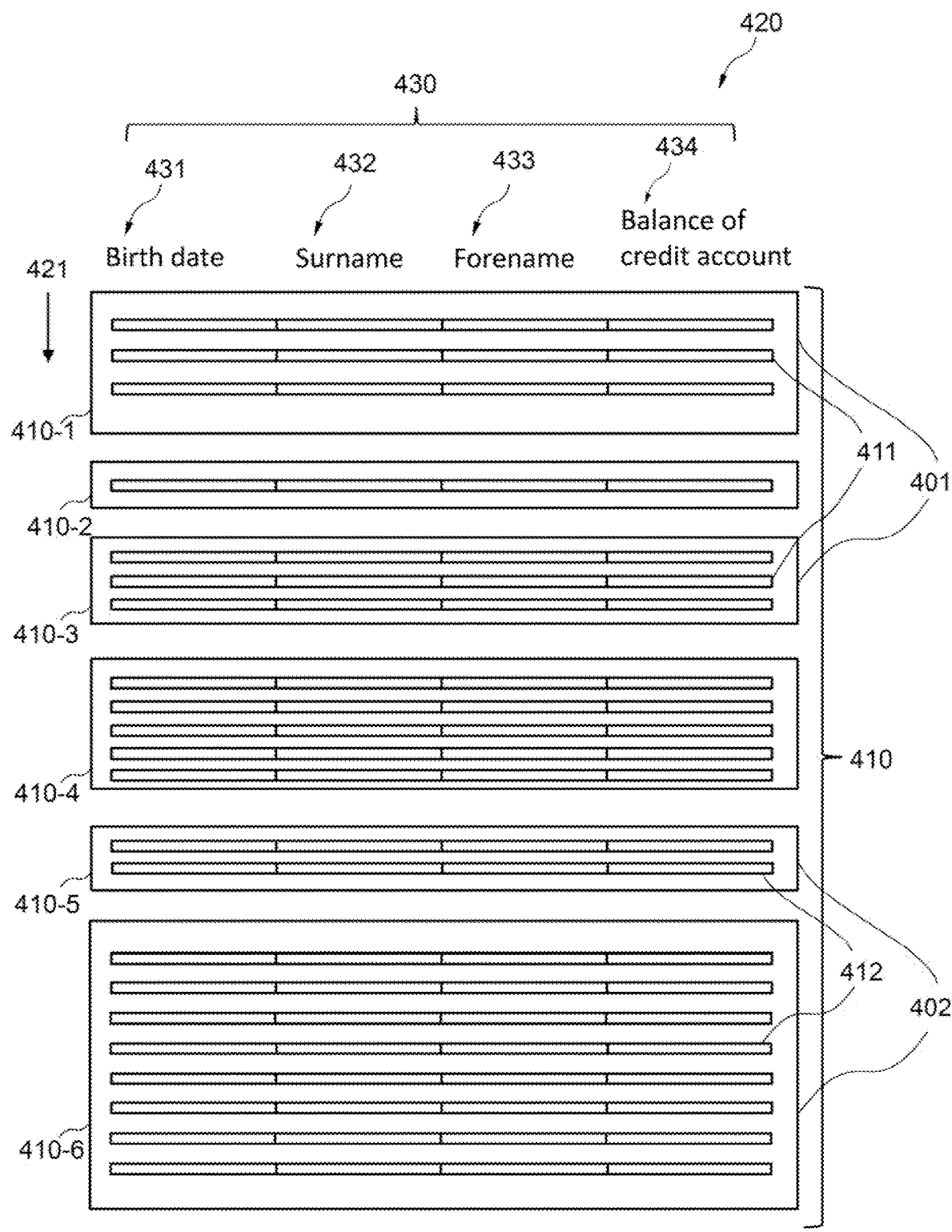
FIG. 4 depicts a data table of the relational database system of FIG. 3 showing a composition of a first partition of data blocks and a composition of a second partition of data blocks according to a first use case.

According to an example shown in FIG. 4, the data 400 may be stored in the form of a data table 420. The data table 420 includes rows and columns 430. The rows may each indicate a single data set, also often referred to as data record, of the data 400. Therefore, the number of rows may increase by one with each data set following the vertical arrow 421 in FIG. 4. However, in the example of FIG. 4, the table 420 may not have an index of the rows. The columns 430 may each specify a different feature. For instance, with respect to a respective row a first column 431 may specify a birth date of a respective person, a second column 432 may specify a surname of the respective person, a third column 433 a forename of the respective person and a fourth column 434 a balance of a credit account of the respective person. Thus, according to this example, the table 420 may represent a bank account database. Each data set includes a number of entries coinciding with the number of columns 430. Each entry of one of the data sets is indicated in the form of a box in FIG. 4. The birth date of the respective person may be given by a month of birth, followed by a day of birth of the respective person.

In the following, one example may be presented wherein the respective information about the property of the data sets of the respective data blocks 410 may be a range of the respective data block 410 indicating a range in which data values of the data sets of the respective data block 410 lie. The respective range may be defined by a respective minimal data value in the respective data block 410-1 and a respective maximal data value in the respective data block 410-N.

Furthermore, the example according to the presented figures may represent a variant in which the range of the respective data block 410-N is defined by a respective minimal data value of the first column 431 of the data table 420 within the respective data block 410-N and a respective maximal data value of the first column 431 of the data table 420 within the respective data block 410-N. The respective data block 410-N may indicate a respective block of rows of the data table 420, i.e., according to the example, a respective block of data records of the data table 420.

The metadata 304 includes the ranges of the respective data blocks 410. The metadata 304 may be stored in the form of a table and includes values given in table 500 shown in FIG. 5. In accordance with the data table 420, which comprises six data blocks, the table 500 includes six rows. In the respective row of table 500, the earliest birth date and the latest birth date given by the data sets of the respective data block 410-N may be stored. For simplicity, only a month and a day of the birth dates are considered. The metadata 304 given by table 500 may correspond to an example, wherein the data sets may be ordered with respect to the data values of the first column 431, hence the birth date of the persons. However, this may not be the case in further applications. In general, the above-shown selection of the type of data, such as the birth date and names, only serves to explain the presented method in a simple manner. Of course, with respect to other possible applications, the data 400 may be directed to technical data values, such as coefficients of material property or data for specifying chemical elements, their behavior, or chemical reactions.

A first simple application of the presented method may be directed to a lottery, including usage of a random number generator. The random number generator may generate data values for specifying the first set of random birth dates. The first set includes the first birth date and second birth date. The person whose birth date is equal to one of the random birth dates of the first set may win 100$. The first query 311 to realize the win on the credit accounts of the persons given the first set of random birth dates may be formulated in SQL-language as follows:

"Update data table 420

Set balance of credit account=balance of credit account+ 100$

Where birth date='first birth date' OR 'second birth date'"

A first predicate, "birth date='first birth date' OR 'second birth date'" may represent the first condition the first data sets 411 have to fulfill according to the first query 311.

The lottery may involve creating a second set of random birth dates using the random number generator. The second set includes a third birth date and a fourth birth date. The person whose birth date is equal to one of the random birth dates of the second set may win 100$. The second query 312 to realize the win on the credit accounts of the persons given the second set of random birth dates may be formulated in SQL-language as follows:

"Update data table 420

Set balance of credit account=balance of credit account+ 100$

Where birth date='third birth date' OR 'fourth birth date'"

A second predicate, "birth date='third birth date' OR 'fourth birth date'" may represent the second condition the second data sets 412 have to fulfill according to the first query 311.

The query compiler may compile the first and the second query 311, 312 into the first plan 321 and the second plan 322, respectively. The first plan 321 includes values for specifying the first and second random birth date and a first executable program containing instructions for updating the data sets fulfilling the first condition, i.e., the first data sets 411. These instructions include, for example, a first load command to load all data sets of the first partition 401 and a first comparison command to initiate a comparison in order to test the first condition on the data sets of the data blocks of the first partition 401.

Similarly, the second plan 322 includes values for specifying the third and fourth random birth date and a second executable program containing instructions for updating the data sets fulfilling the second condition, i.e., the second data sets 412. These instructions include, for example, a second load command to load all data sets of the second partition 402 and a second comparison command to initiate a comparison in order to test the second condition on the data sets of the data blocks of the second partition 402.

In a first use case of the presented method, the first random birth date is "02.02.", the second random birth date is "01.07.", the third random birth date is "02.10." and the fourth random birth date is "10.12.".

The query compiler 302 may generate the first load command to load all data sets of the first partition 401 using the metadata 304, in this case, table 500 in another case table 1000, the first and second random birth date, and the first predicate. The query compiler 302 may infer that the first data sets 411 may only be stored in the first data block 410-1 and the third data block 410-3 using the first and second random birth date and the metadata 304. Analogously, the query compiler 302 may generate the second load command to load all data sets of the second partition 402 using the metadata 304, the third and fourth random birth date, and the second predicate. The query compiler 302 may infer that the second data sets 412 may only be stored in the fifth data block 410-5 and the sixth data block 410-6 using the third and fourth random birth date and the metadata 304. The first plan 321 and the second plan 322 may be transferred from the query compiler 302 to the stack 303.

According to the first use case, the first partition 401 of data sets, which may be potentially accessed in case the first plan 321 is executed, includes the first data block 410-1 and the third data block 410-3. Furthermore, considering the first use case, the second partition 402 of data sets which may be potentially accessed in case the second plan 322 is executed includes the fifth data block 410-5 and the sixth data block 410-6. Hence, the first use case may represent a case where the first partition 401 and the second partition 401 are disjoint. FIG. 4 shows a possible distribution of the first data sets 411 and the second data sets 412 and possible composition of the first partition 401 and the second partition 402 for the first use case.

Figures 5, 6:
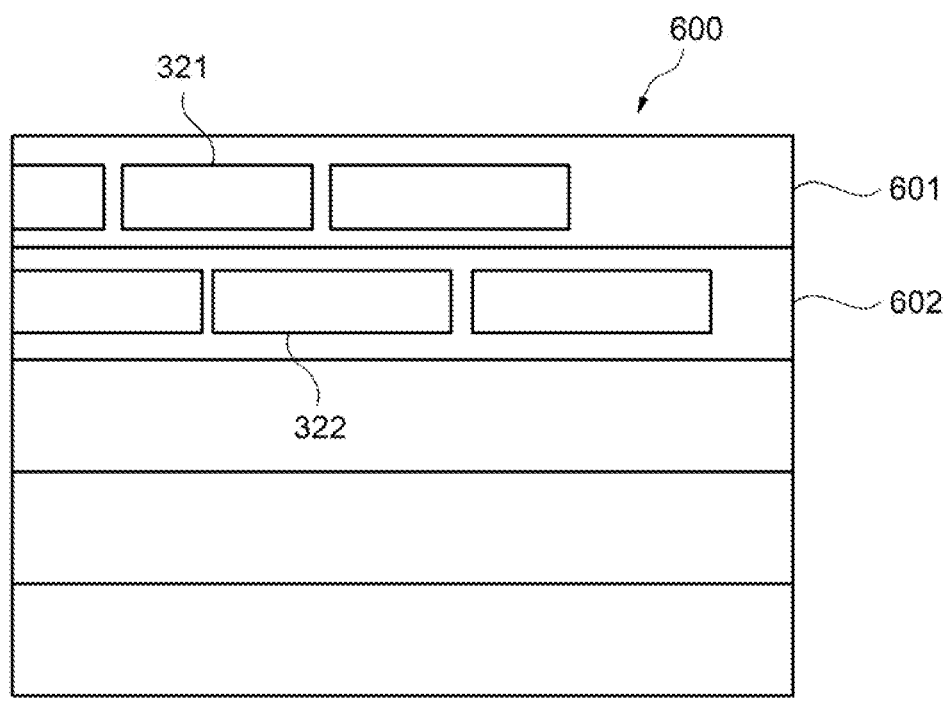
FIG. 5 depicts a table indicating metadata of data blocks of the data table of FIG. 4.
FIG. 6 depicts a schedule for scheduling a first query execution plan and a second query execution plan on the RDBS.

The workload manager 301 may receive information for specifying the first partition 401 and the second partition 402 from the query optimizer 302. In this example, the determining of the first and second partition 401, 402 may be performed by a remote device, here the query compiler 302, with respect to the workload manager 301. The workload manager 301 may perform the examination if there is a common partition of data blocks of the first partition 401 and the second partition 402. Considering the first use case, a result of this examination may be that there is no common partition. In this case, the workload manager 301 may schedule the first plan 321 and the second plan 322 such that the first plan 321 and the second plan 322 are executed in parallel on the RDBS 300. To realize this, the workload manager 301 may generate schedule 600 such that the first plan 321 and the second plan 322 are scheduled to run in parallel, as shown in FIG. 6. The schedule 600 may determine which computing unit of a rack of computing units 340 of the RDBS 300 may execute which execution plan of the set 331 of execution plans. The rack 340 includes, for example, a first computing unit 341, a second computing unit 342, a third computing unit 343, a fourth computing unit 344, and a fifth computing unit 345. The schedule includes one queue for each computing unit of the rack 340, i.e., a first queue 601 for the first computing unit 341, a second queue 602 for the second computing unit 342, and so forth.

The first and second plan 321, 322 may be considered as computing jobs for the computing units and are shown in the form of boxes in FIG. 6. Unlabeled boxes in FIG. 6 may indicate further computing jobs, which may be scheduled by the workload manager 301 as well. In the first use case, the schedule 600 may determine that the first plan 321 is going to be executed by the first computing unit 341 and the second plan 322 is going to be executed by the second computing unit 342, both plans 321, 322 being scheduled at least partially parallel. Hence, for the first use case, the schedule 600 is designed such that there is a temporal overlap of the first plan 321 and the second plan 322. In one example, the first plan 321 and the second plan 322 may be scheduled to start at the same time.

The left parts of one of the respective queues indicate an actual computing job running on the respective computing unit being assigned to this respective queue. The queues extend from the left to the right showing jobs to be executed by the respective computing units in temporal order, the respective last job of each computing unit shown on the right side of each respective queue.

The computing units of the rack 340 may access a database server 306 of the RDBS 300, including various data tables comprising the data table 420 for executing the execution plans of the set 331, including the first plan 321 and the second plan 322.

In one example, the workload manager 301 may receive information if the first partition 401 and the second partition 402 are disjoint or not from the query optimizer 302. In this example, the workload manager 301 may only perform the generation of the schedule 600, and the query compiler 302 may perform the other steps of the presented method.

In the first use case, the workload manager 301 may deactivate a locking mechanism of the RDBS. The locking mechanism may be configured for locking at least a part of the first partition 401 of the data blocks and/or the second partition 402 of the data blocks. A locking of these data blocks may cause that these data blocks may only be accessed by execution of a single query execution plan, for example, the first plan 321 or the second plan 322, at an instant of time.

In a second use case of the presented method, the first random birth date is "02.02.", the second random birth date is "01.07.", the third random birth date is "10.07." and the fourth random birth date is "10.12.".

Figure 7:
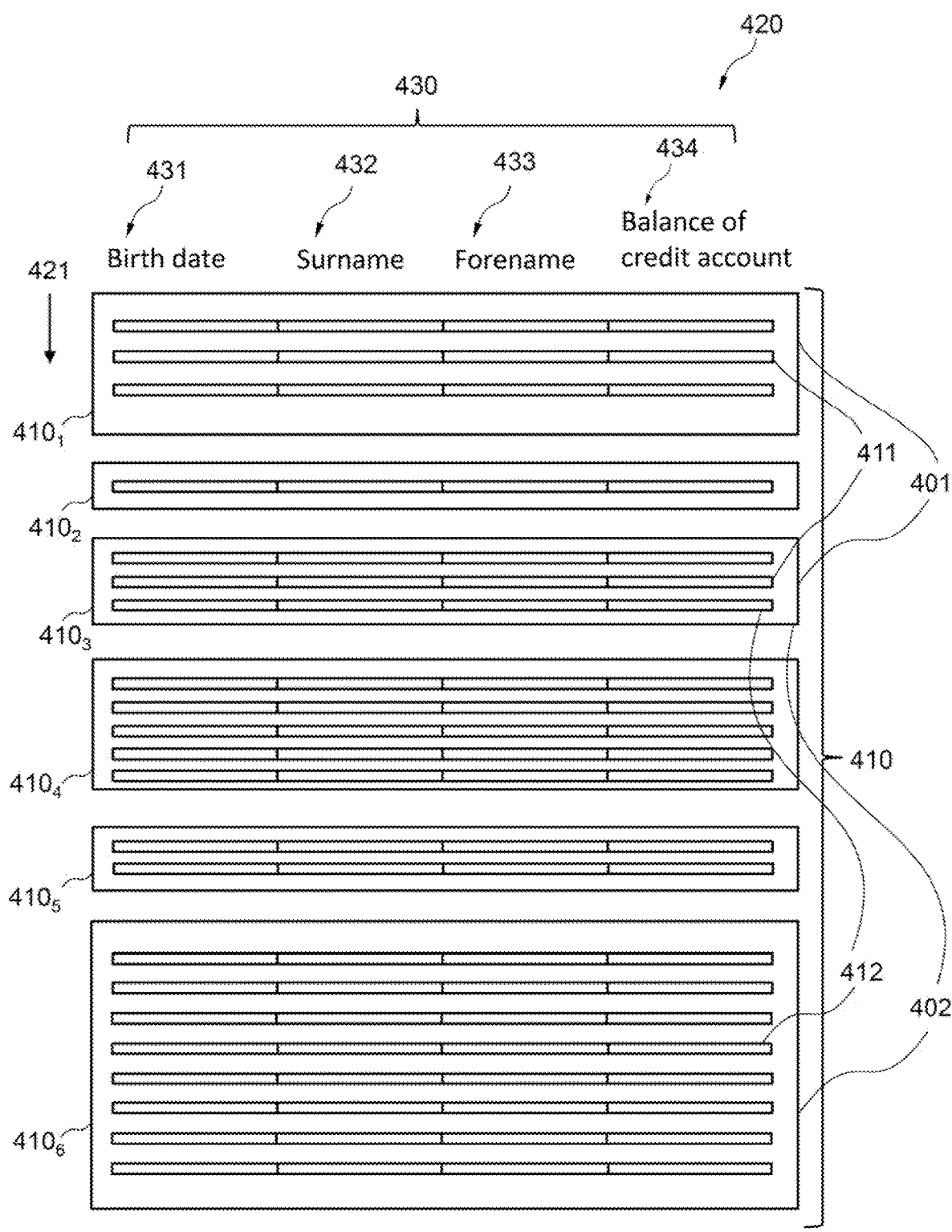
FIG. 7 depicts a composition of a first partition of data blocks and a composition of a second partition of data blocks according to a second use case.

According to the second use case, the first partition 401 of data sets, which may be potentially accessed in case the first plan 321 is executed includes the first data block 410-1 and the third data block 410-3. Furthermore, considering the first use case, the second partition 402 of data sets which may be potentially accessed in case the second plan 322 is executed includes the third data block 410-3 and the sixth data block 410-6. Hence, the second use case may represent a case where the first partition 401 and the second partition 401 are not disjoint. FIG. 7 shows a possible distribution of the first data sets 411 and the second data sets 412 and possible composition of the first partition 401 and the second partition 402 for the second use case.

Figure 8:
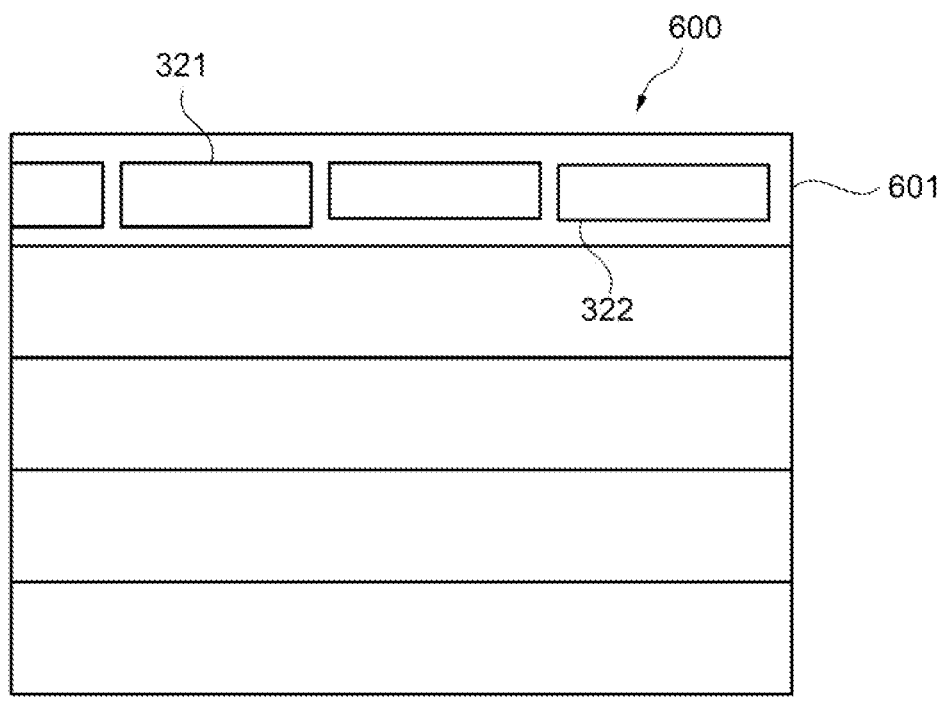
FIG. 8 depicts a further schedule for scheduling a first query execution plan and a second query execution plan on the RDBS.

Similar to the first use case, the workload manager 301 may perform the examination if there is a common partition of data blocks of the first partition 401 and the second partition 402 in the second use case. Considering the second use case, a result of this examination may be that there is a common partition. The common partition includes the third data block 410-3. In this case, the workload manager 301, according to a first variant, may schedule the first plan 321 and the second plan 322 such that a result of the first plan 321 is available in a cache memory of the RDBS 300 for the usage of the second plan 322. One way to realize this may be that the workload manager 301 generates the schedule 600 such that the second plan 322 is scheduled in the same queue, for example, according to a first example of the first variant, the first queue 601, as the first plan 321. This may enable that the data sets of the data blocks of the first partition 401 may be stored in the cache of first computing unit 341 after the first computing unit 341 has executed the first plan 321 and when the first computing unit 341 executes the second plan 322. FIG. 8 shows the schedule 600 generated by the workload manager 301, according to the first example of the first variant of the second use case.

Analogously, if both plans 321, 322 are scheduled in the second queue 602, this may enable that the data sets of the data blocks of the first partition 401 may be stored in the cache of second computing unit 342 after the second computing unit 342 has executed the first plan 321 and when the second computing unit 342 executes the second plan 322.

Figure 9:
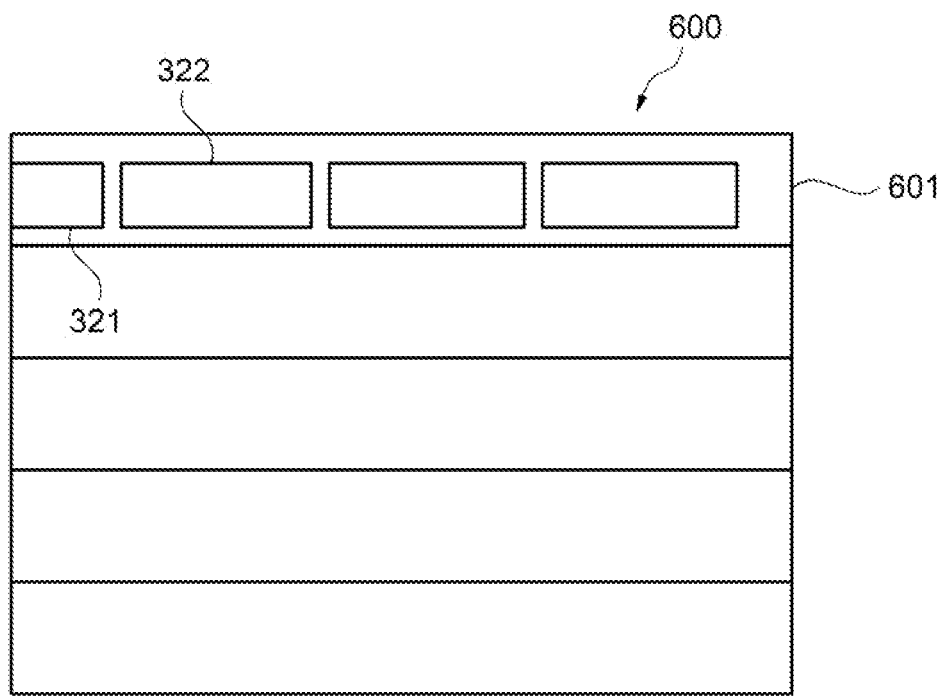
FIG. 9 depicts a schedule for scheduling a first query execution plan and a second query execution plan on the RDBS according to a further variant.

According to a second example of the first variant of the second use case, the workload manager 301 may schedule the first plan 321 and the second plan 322 such that the first plan 321 and the second plan 322 are scheduled to be run immediately after each other. One way to realize this may be that the workload manager 301 generates the schedule 600 such that the second plan 322 is scheduled in the same queue, for example, the first queue 601, as the first plan 321 following directly after the first plan 321. FIG. 9 shows the schedule 600 generated by the workload manager 301, according to the second example of the first variant of the second use case. Furthermore, FIG. 9 depicts an example of the schedule 600 where the first plan 321 is running at an actual instant of time and the second plan 322 is scheduled to be started at a future instant of time. However, according to another example, in order to represent an application of the second example of the first variant of the second use case, the first plan 321 does not necessarily need to run at the actual instant of time.

Generally, considering all of the above use cases, variants, and examples, the workload manager 301 may, in one example, send the schedule 600 to a job manager at the rack 340. In another example, the workload manager 301 may initiate the computing jobs, for example, the first plan 321 and/or the second plan 322, on the rack 340 using the schedule 600. In one example, the rack 340 includes the workload manager 301. In this case, the workload manager 301 may control and log the computing jobs on the rack 340.

In the following, a further variant may be described where the data sets are not ordered by the birth date as mentioned above. In this case the metadata 304 with respect to the first column may contain values given in the table 1000 shown in FIG. 10. In accordance with the data table 420, which comprises six data blocks, the table 1000 includes six rows. In the respective row of table 500 the earliest birth date and the latest birth date given by the data sets of the respective data block 410-N may be stored.

Figure 11:
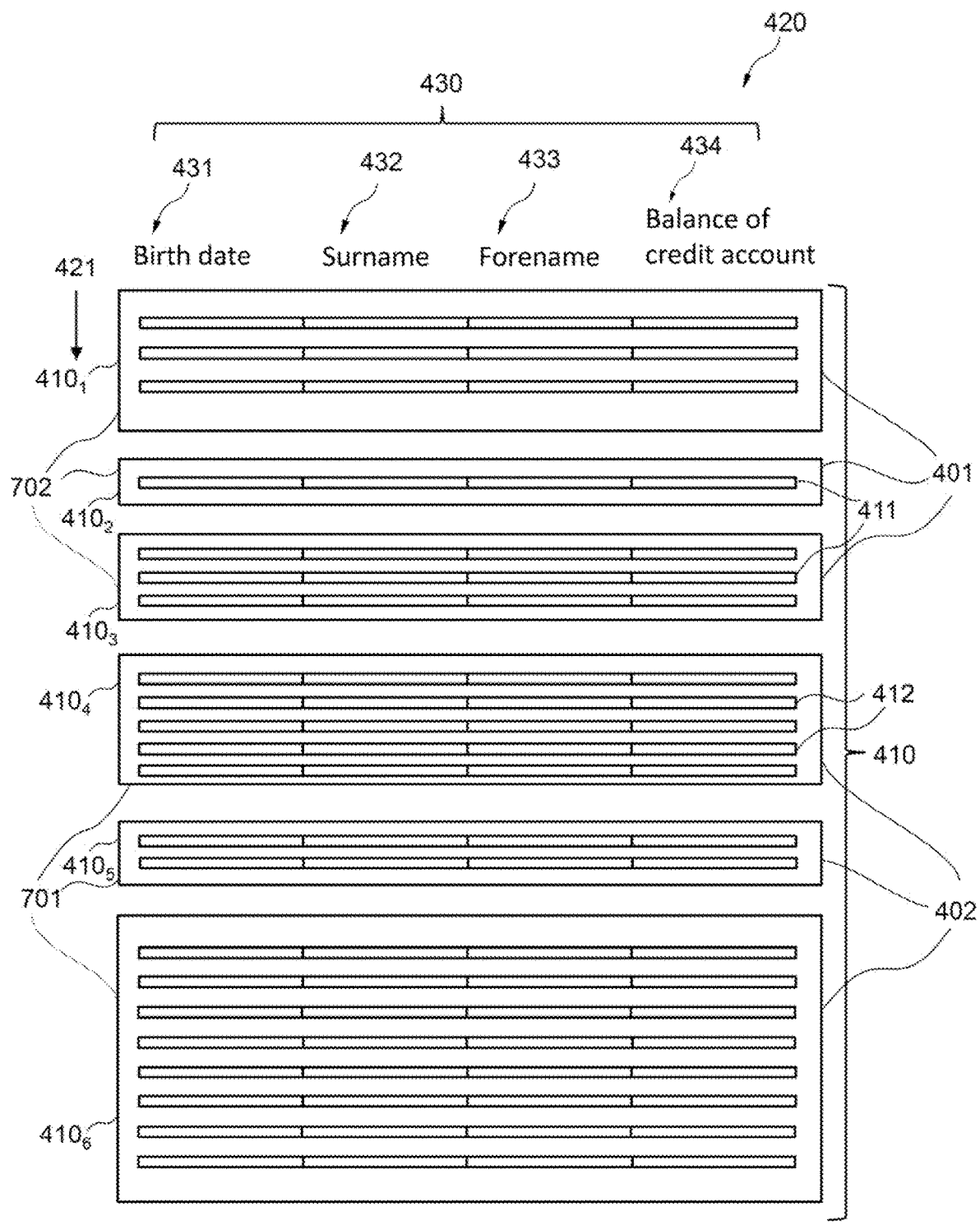
FIG. 11 depicts a composition of a first partition of data blocks and a composition of a second partition of data blocks according to a further variant of the first use case.

In the further variant and according to the first use case, i.e., the first random birth date is "02.02.", the second random birth date is "01.07.", the third random birth date is "02.10." and the fourth random birth date is "10.12.", the first partition 401 of data sets which may be potentially accessed in case the first plan 321 is executed includes the first data block 410-1, the second data block 410-2 and the third data block 410-3. Furthermore, considering the further variant and the first use case, the second partition 402 of data sets which may be potentially accessed in case the second plan 322 is executed includes the fourth data block 410-4, the fifth data block 410-5, and the sixth data block 410-6. Hence, considering the further variant, the first use case may as well represent a case where the first partition 401 and the second partition 401 are disjoint. FIG. 11 shows a possible distribution of the first data sets 411 and the second data sets 412 and a possible composition of the first partition 401 and the second partition 402 considering the further variant and the first use case.

In the further variant, the determining of the first partition 401 includes discarding the first complementary partition 701 of the data blocks 410 on the basis of the metadata 304 and the first condition. The first complementary partition 701 may represent data blocks of the data blocks 410 not being accessed in case the first plan 321 is executed on the RDBS 300. Furthermore, the determining of the second partition 402 includes discarding the second complementary partition 702 of the data blocks 410 on the basis of the metadata 304 and the second condition. The second complementary partition 702 may represent data blocks of the data blocks 410 not being accessed in case the second plan 322 is executed on the RDBS 300.

The workload manager 301 or the query compiler 302 may perform the discarding of the first complementary partition 701 using the metadata 304 given by the table 1000, the first and second random birth date, and the first predicate. Similarly, the workload manager 301 or the query compiler 302 may perform the discarding of the second complementary partition 702 using the metadata 304 given by the table 1000, the third and fourth random birth date, and the second predicate. For example, if the first and second random birth date does not lie in the range of the respective data block 410-N given by the table 1000, this data block 410-N may be discarded for determining the first partition 401. According to the first use case, the first complementary partition 701 includes the fourth data block 410-4, the fifth data block 410-5 and the sixth data block 410-6. The first partition 401 may then be determined as a set of data blocks comprising the data blocks 410 without the first complementary partition 701. Analogously, the second complementary partition 702 may be determined, and the second partition 402 on the basis of the second complementary partition 702.

As in the further variant of the first use case, the first partition 401 and the second partition 402 are disjoint, i.e., a common partition of the first partition 401 and the second partition 402 does not exists, the workload manager 301 may perform the scheduling similarly to the variant of the first use case where the data sets are ordered with respect to the birth date.

Figure 12:
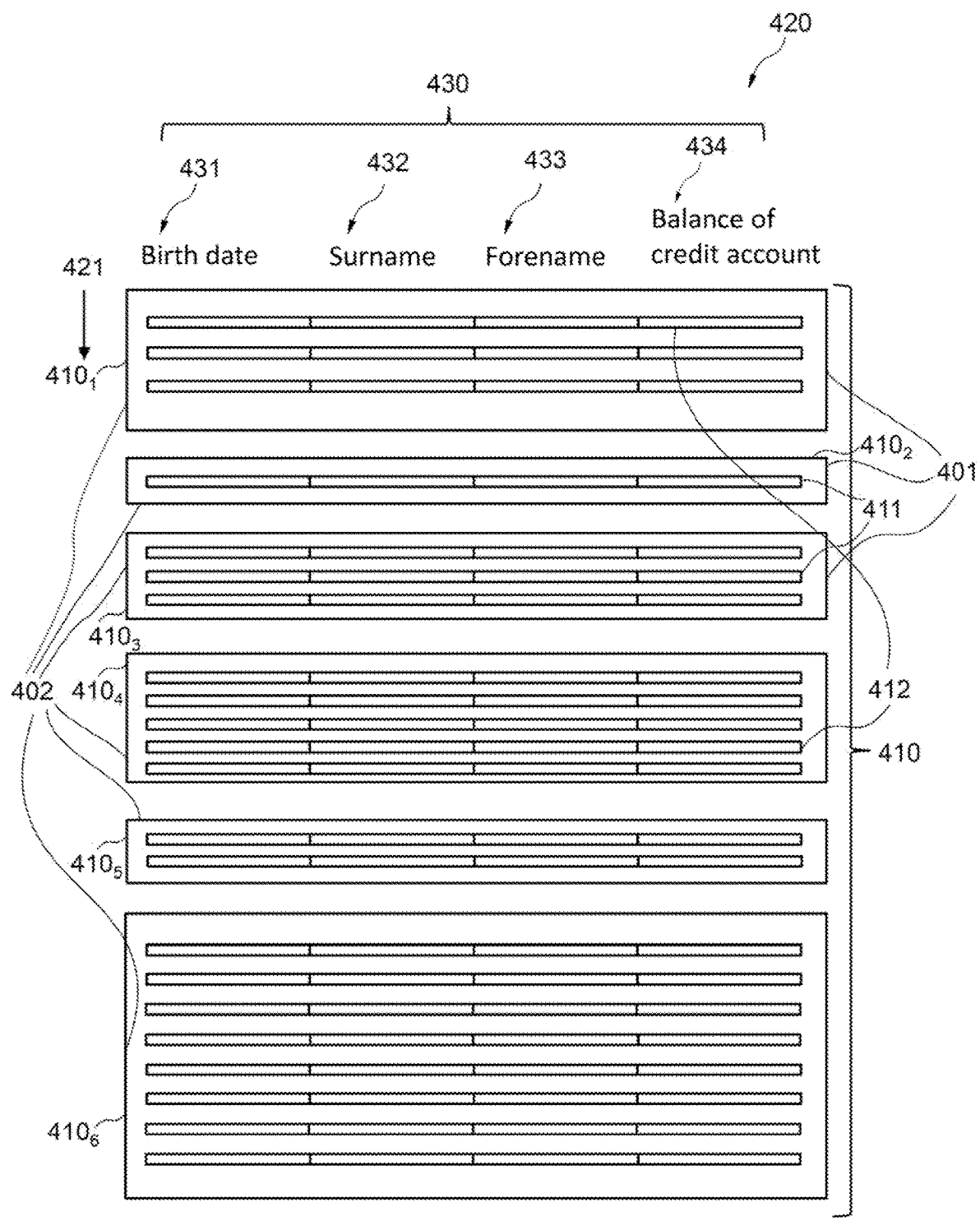
FIG. 12 depicts a composition of a first partition of data blocks and a composition of a second partition of data blocks according to a further variant of the second use case.

Considering the further variant and the second use case, i.e., the first random birth date is "02.02.", the second random birth date is "01.07.", the third random birth date is "10.07." and the fourth random birth date is "10.12.", the first partition 401 of data sets which may be potentially accessed in case the first plan 321 is executed includes the first data block 410-1, the second data block 410-2 and the third data block 410-3. Furthermore, considering the further variant and the second use case, the second partition 402 of data sets, which may be potentially accessed in case the second plan 322 is executed, includes all data blocks 410. Hence, considering the further variant, the second use case may as well represent a case where the first partition 401 and the second partition 401 are not disjoint. FIG. 12 shows a possible distribution of the first data sets 411 and the second data sets 412 and possible composition of the first partition 401 and the second partition 402 considering the further variant and the second use case.

As in the further variant of the second use case, the first partition 401 and the second 402 are not disjoint, i.e., a common partition of the first partition 401 and the second partition 402 exists, the workload manager 301 may perform the scheduling similarly to the variant of the second use case where the data sets are ordered with respect to the birth date.

Figure 13:
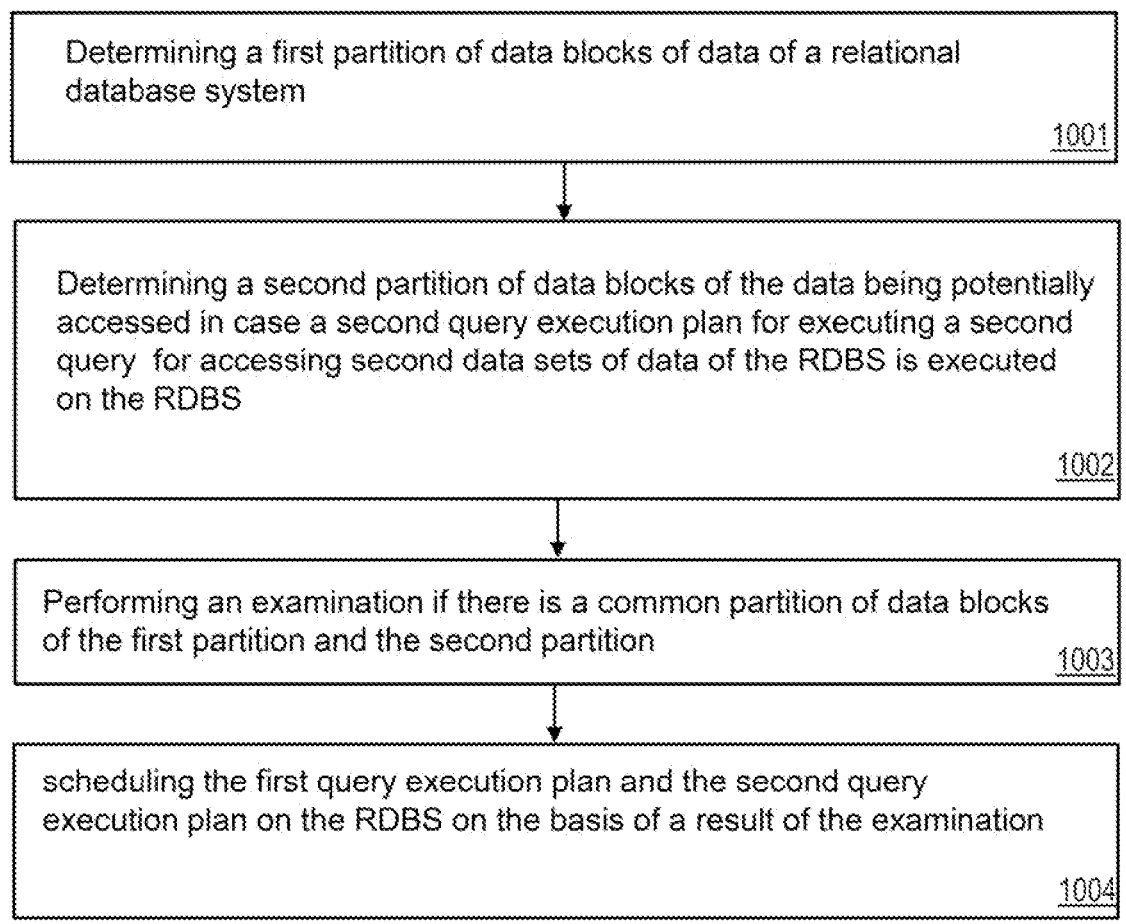
FIG. 13 depicts a flowchart of a computer implemented method for scheduling a first query execution plan and a second query execution plan on the RDBS.

FIG. 13 shows a flowchart of a computer implemented method for scheduling the set 331 of query execution plans.

In step 1001, the first partition 401 of the data blocks being potentially accessed in case the first query execution plan 321 is executed on the RDBS 300 may be determined on the basis of the metadata 304 and the first condition.

In step 1002, the second partition 402 of the data blocks being potentially accessed in case the second query execution plan 322 is executed on the RDBS 300 may be determined on the basis of the metadata 304 and the second condition.

In step 1003, the examination if there is a common partition of data blocks of the first partition 401 and the second partition 402 may be performed.

In step 1004, the first query execution plan 321 and the second query execution plan 322 may be scheduled on the RDBS 300 on the basis of a result of the examination.

The present disclosure may be a system, a method, and/or a computer program product at any possible technical detail level of integration. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following, the disclosure will be described again by a list of clauses highlighting several possible, non-exclusive combinations of features disclosed herein:

A computer implemented method for scheduling a set of query execution plans, the set of query execution plans comprising at least a first query execution plan for executing a first query for accessing first data sets of data of a relational database system, RDBS, and a second query execution plan for executing a second query for accessing second data sets of the data, the data being divided into data blocks of data sets of the data, wherein metadata of the RDBS comprises a respective information about at least one property of the data sets of a respective data block of the data blocks, the method comprising:
  determining a first partition of the data blocks being potentially accessed in case the first query execution plan is executed on the RDBS on the basis of the metadata and a condition the first data sets have to fulfill according to the first query;
  determining a second partition of the data blocks being potentially accessed in case the second query execution plan is executed on the RDBS on the basis of the metadata and a condition the second data sets have to fulfill according to the second query;
  performing an examination if there is a common partition of data blocks of the first partition and the second partition;
  scheduling the first query execution plan and the second query execution plan on the RDBS on the basis of a result of the examination.

The method of clause 1, the determining of the first partition comprising discarding a first complementary partition of the data blocks on the basis of the metadata and the condition the first data sets have to fulfill according to the first query, the first complementary partition of the data blocks representing data blocks of the data not being accessed in case the first query execution plan is executed on the RDBS, and the determining of the second partition comprising discarding a second complementary partition of the data blocks using the metadata and the condition the second data sets have to fulfill according to the second query, the second complementary partition of the data blocks representing data blocks of the data not being accessed in case the second query execution plan is executed on the RDBS.

The method of clause 1 or 2, the method further comprising scheduling the first query execution plan and the second query execution plan such that the first query execution plan and the second query execution plan are executed in parallel on the RDBS if there is no common partition of data blocks of the first partition and the second partition.

The method of clause 1 or 2, the method further comprising scheduling the first query execution plan and the second query execution plan such that a result of the first query execution plan is available in a cache memory of the RDBS for a usage of the second query execution plan if there is a common partition of data blocks of the first partition and the second partition.

The method of clause 1, 2 or 3, the method further comprising deactivating a locking mechanism of the RDBS for locking at least a part of the first partition of the data blocks and the second partition of the data blocks, the locking mechanism provoking that these data blocks may only be accessed by an execution of a single query execution plan at an instant of time, wherein the locking mechanism is deactivated if there is no common partition of data blocks of the first partition and the second partition.

The method of clause 1, 2 or 4, the method further comprising activating a locking mechanism of the RDBS for locking the data blocks of the common partition such that these data blocks may only be accessed by an execution of a single query execution plan at an instant of time, wherein the locking mechanism is activated if there is a common partition of data blocks of the first partition and the second partition.

The method according to one of the previous clauses, wherein the respective information about the property of the data sets of the respective data block is a range in which data values of the data sets of the respective data block lie, the range being defined by a minimal data value in the respective data block and a maximal data value in the respective data block.

The method of clause 7, wherein the data of the RDBS is stored in the RDBS by using a data table and the range is defined by a minimal data value in a column of the data table in the respective data block and a maximal data value in the column of the data table in the respective data block, the respective data block indicating a respective block of rows of the data table.

The method according to one of the previous clauses 1 to 6, wherein the property of the data sets is a distribution of data values of the data sets within the respective data block and the respective information about the property of the data sets of the respective data block is describing the distribution of the data values.

The method of clause 9, wherein the data of the RDBS is stored in the RDBS by using a data table and the distribution refers to a distribution of the data values in a column of the data table in the respective data block and the respective information about the property of the data sets of the respective data block is describing the distribution of the data values in the column of the data table within the respective data block, the respective data block indicating a respective block of rows of the data table.

The method of clause 9 or 10, wherein the distribution is represented by a density vector.

The method according to one of the previous clauses, wherein one of the two query execution plans, the first or the second query execution plan, is running at an actual instant of time and the other one of the two query execution plans is scheduled to be started at a future instant of time.

The method of clause 1, 2, 4, 6, 7, 8, 9, 10, 11 or 12, wherein the first query execution plan and the second query execution plan are scheduled to be run immediately after each other.

The method according to one of the previous clauses, the method further comprising receiving the metadata from a query optimizer of the RDBS.

The method according to one of the previous clauses, the method further comprising receiving information for specifying the first partition and the second partition from a query optimizer of the RDBS.

The method according to one of the previous clauses, the method further comprising setting boundary conditions for running a query optimizer of the RDBS such that the common partition is void.

A computer program product comprising a computer-readable storage medium having computer-readable program code embodied therewith, the computer-readable program code configured to implement the method according to according to one of the previous clauses.

A computer system for scheduling a set of query execution plans, the set of query execution plans comprising at least a first query execution plan for executing a first query for accessing first data sets of data of a relational database system, RDBS, and a second query execution plan for executing a second query for accessing second data sets of the data, the data being divided into data blocks of data sets of the data, wherein metadata of the RDBS comprises a respective information about at least one property of the data sets of a respective data block of the data blocks, the computer system being configured for: determining a first partition of the data blocks being potentially accessed in case the first query execution plan is executed on the RDBS on the basis of the metadata and a condition the first data sets have to fulfill according to the first query; determining a second partition of the data blocks being potentially accessed in case the second query execution plan is executed on the RDBS on the basis of the metadata and a condition the second data sets have to fulfill according to the second query; performing an examination if there is a common partition of data blocks of the first partition and the second partition; scheduling the first query execution plan and the second query execution plan on the RDBS on the basis of a result of the examination.

What is claimed is:

1. A computer implemented method for scheduling a set of query execution plans, the set of query execution plans, compiled by a query compiler, comprising at least a first query execution plan for executing a first query for accessing first data sets of data of a relational database system (RDBS) and a second query execution plan for executing a second query for accessing second data sets of the data, the data being divided into data blocks of data sets of the data, wherein metadata of the RDBS comprises a respective information about a distribution of data values of the data sets of a respective data block of the data blocks, the respective data block corresponding to an amount of physical space in the RDBS, the method comprising:

determining a first partition of the data blocks to be potentially accessed when the first query execution plan is executed on the RDBS on the basis of the metadata and a condition the first data sets have to fulfill according to the first query, wherein the determining includes discarding a first complementary partition of the data blocks on the basis of the metadata and the condition the first data, the first complementary partition of the data blocks representing data blocks of the data not being accessed in case the first query execution plan is executed on the RDBS;

determining a second partition of the data blocks to be potentially accessed when the second query execution plan is executed on the RDBS on the basis of the metadata and another condition the second data sets have to fulfill according to the second query, wherein the determining includes discarding a second complementary partition of the data blocks on the basis of the metadata and the condition the second data, the second complementary partition of the data blocks representing data blocks of the data not being accessed in case the second query execution plan is executed on the RDBS;

examining, by a workload manager, the first partition and the second partition of the data blocks to determine whether there is a common partition of data blocks of the first partition and the second partition that prevents parallel execution of the first query execution plan and the second query execution plan on the RDBS, wherein the common partition of data blocks is identified when the first partition of the data blocks and the second partition of the data blocks are not disjoint;

generating, by the workload manager, a schedule based on the examining, wherein parallel execution of the first query execution plan and the second query execution plan is allowed when no common partition exists, and wherein the schedule indicates an execution of the first query execution plan and the second query execution plan; and scheduling the first query execution plan and the second query execution plan on the RDBS based on the schedule.

2. The method of claim 1, further comprising:
scheduling the first query execution plan and the second query execution plan such that the first query execution plan and the second query execution plan are executed in parallel on the RDBS when no common partition of data blocks of the first partition and the second partition exists.

3. The method of claim 1, further comprising:
scheduling the first query execution plan and the second query execution plan such that a result of the first query execution plan is available in a cache memory of the RDBS for a usage of the second query execution plan when a common partition of data blocks of the first partition and the second partition exists.

4. The method of claim 1, further comprising:
deactivating a locking mechanism of the RDBS for locking at least a part of the first partition of the data blocks and the second partition of the data blocks, the locking mechanism provoking that these data blocks may only be accessed by an execution of a single query execution plan at an instant of time, wherein the locking mechanism is deactivated if there is no common partition of data blocks of the first partition and the second partition.

5. The method of claim 1, further comprising:
activating a locking mechanism of the RDBS for locking the data blocks of the common partition such that these data blocks are only accessed by an execution of a single query execution plan at an instant of time, wherein the locking mechanism is activated when a common partition of data blocks of the first partition and the second partition exists.

6. The method of claim 1, wherein the respective information is a range in which the data values of the data sets of the respective data block lie, the range is defined by a minimal data value in the respective data block and a maximal data value in the respective data block.

7. The method of claim 6, wherein the data of the RDBS is stored in the RDBS by using a data table and the range is defined by a minimal data value in a column of the data table in the respective data block and a maximal data value in the column of the data table in the respective data block, the respective data block indicating a respective block of rows of the data table.

8. The method of claim 1, wherein the respective information describes the distribution of the data values.

9. The method of claim 8, wherein the data of the RDBS is stored in the RDBS using a data table and the distribution refers to a distribution of the data values in a column of the data table in the respective data block and the respective information describes the distribution of the data values in the column of the data table within the respective data block, the respective data block indicating a respective block of rows of the data table.

10. The method of claim 8, wherein the distribution is represented by a density vector.

11. The method of claim 1, wherein one of the two query execution plans, the first or the second query execution plan, is running at an actual instant of time and the other one of the two query execution plans is scheduled to be started at a future instant of time.

12. The method of claim 3, wherein the first query execution plan and the second query execution plan are scheduled to run immediately after each other.

13. The method of claim 1, the method further comprising receiving the metadata from a query optimizer of the RDBS.

14. The method of claim 1, the method further comprising receiving information for specifying the first partition and the second partition from a query optimizer of the RDBS.

15. The method of claim 1, the method further comprising setting boundary conditions for running a query optimizer of the RDBS such that the common partition is void.

16. A computer program product comprising one or more computer readable storage medium, and program instructions stored on the one or more computer readable storage medium for scheduling a set of query execution plans, compiled by a query compiler, the set of query execution plans comprising at least a first query execution plan for executing a first query for accessing first data sets of data of a relational database system (RDBS) and a second query execution plan for executing a second query for accessing second data sets of the data, the data being divided into data blocks of data sets of the data, wherein metadata of the RDBS comprises a respective information about a distribution of data values of the data sets of a respective data block of the data blocks, the respective data block corresponding to an amount of physical space in the RDBS, the computer instructions comprising:

program instructions to determine a first partition of the data blocks to be potentially accessed when the first query execution plan is executed on the RDBS on the basis of the metadata and a condition the first data sets have to fulfill according to the first query, wherein determining the first partition includes discarding a first complementary partition of the data blocks on the basis of the metadata and the condition the first data, the first complementary partition of the data blocks representing data blocks of the data not being accessed in case the first query execution plan is executed on the RDBS;

program instructions to determine a second partition of the data blocks to be potentially accessed when the second query execution plan is executed on the RDBS on the basis of the metadata and another condition the second data sets have to fulfill according to the second query, wherein determining the second partition includes discarding a second complementary partition of the data blocks on the basis of the metadata and the condition the second data, the second complementary partition of the data blocks representing data blocks of the data not being accessed in case the second query execution plan is executed on the RDBS;

program instructions to examine, by a workload manager, the first partition and the second partition of the data blocks to determine whether there is a common partition of data blocks of the first partition and the second partition that prevents parallel execution of the first query execution plan and the second query execution plan on the RDBS, wherein the common partition of data blocks is identified when the first partition of the data blocks and the second partition of the data blocks are not disjoint;

program instructions to generate, by the workload manager, a schedule based on the examining, wherein parallel execution of the first query execution plan and the second query execution plan is allowed when no common partition exists, and wherein the schedule indicates an execution of the first query execution plan and the second query execution plan; and program instructions to schedule the first query execution plan and the second query execution plan on the RDBS based on the schedule.

17. A computer system for scheduling a set of query execution plans, compiled by a query compiler, the set of query execution plans comprising at least a first query execution plan for executing a first query for accessing first data sets of data of a relational database system (RDBS) and a second query execution plan for executing a second query for accessing second data sets of the data, the data being divided into data blocks of data sets of the data, wherein metadata of the RDBS comprises a respective information about a distribution of data values of the data sets of a respective data block of the data blocks, the respective data block corresponding to an amount of physical space in the RDBS, the computer system being configured for:

- determining a first partition of the data blocks to be potentially accessed when the first query execution plan is executed on the RDBS on the basis of the metadata and a condition the first data sets have to fulfill according to the first query, wherein the determining includes discarding a first complementary partition of the data blocks on the basis of the metadata and the condition the first data, the first complementary partition of the data blocks representing data blocks of the data not being accessed in case the first query execution plan is executed on the RDBS;
- determining a second partition of the data blocks to be potentially accessed when the second query execution plan is executed on the RDBS on the basis of the metadata and another condition the second data sets have to fulfill according to the second query, wherein the determining includes discarding a second complementary partition of the data blocks on the basis of the metadata and the condition the second data, the second complementary partition of the data blocks representing data blocks of the data not being accessed in case the second query execution plan is executed on the RDBS;
- examining, by a workload manager, the first partition and the second partition of the data blocks to determine whether there is a common partition of data blocks of the first partition and the second partition that prevents parallel execution of the first query execution plan and the second query execution plan on the RDBS, wherein the common partition of data blocks is identified when the first partition of the data blocks and the second partition of the data blocks are not disjoint;
- generating, by the workload manager, a schedule based on the examining, wherein parallel execution of the first query execution plan and the second query execution plan is allowed when no common partition exists, and wherein the schedule indicates an execution of the first query execution plan and the second query execution plan; and
- scheduling the first query execution plan and the second query execution plan on the RDBS based on the schedule.

18. The computer system of claim 17, further configured for:

- scheduling the first query execution plan and the second query execution plan such that the first query execution plan and the second query execution plan are executed in parallel on the RDBS when no common partition of data blocks of the first partition and the second partition exists.

* * * * *